US010287991B2

(12) United States Patent
Suciu et al.

(10) Patent No.: US 10,287,991 B2
(45) Date of Patent: May 14, 2019

(54) GAS TURBINE ENGINE WITH PAIRED DISTRIBUTED FAN SETS

(71) Applicant: UNITED TECHNOLOGIES CORPORATION, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

(*) Notice: Subject to any disclaimer, the term of this patent is extended or adjusted under 35 U.S.C. 154(b) by 1070 days.

(21) Appl. No.: 14/600,101

(22) Filed: Jan. 20, 2015

(65) Prior Publication Data

US 2015/0361900 A1    Dec. 17, 2015

Related U.S. Application Data

(60) Provisional application No. 61/989,661, filed on May 7, 2014, provisional application No. 61/938,907, filed on Feb. 12, 2014, provisional application No. 61/937,153, filed on Feb. 7, 2014.

(51) Int. Cl.
*F02C 7/36* (2006.01)
*F02C 3/10* (2006.01)

(52) U.S. Cl.
CPC . *F02C 7/36* (2013.01); *F02C 3/10* (2013.01)

(58) Field of Classification Search
CPC .. F02C 3/067; F02C 3/10; F02C 3/107; F02C 7/36; F02K 3/04; F02K 3/072; F02K 3/065; F02K 3/068; F02K 3/075; F02K 3/077; F02K 3/12
See application file for complete search history.

(56) References Cited

U.S. PATENT DOCUMENTS

| 3,054,577 | A |   | 9/1962  | Wolf et al. |
| 3,068,647 | A | * | 12/1962 | Santamaria ......... B64C 29/0066 244/12.5 |
| 3,368,352 | A | * | 2/1968  | Hewson ................ F02K 3/025 60/224 |
| 5,161,369 | A |   | 11/1992 | Williams |
| 5,619,850 | A | * | 4/1997  | Palmer .................. F01D 11/04 60/39.83 |
| 6,792,745 | B2 |  | 9/2004  | Wojciechowski |
| 7,752,834 | B2 |  | 7/2010  | Addis |
| 8,015,796 | B2 |  | 9/2011  | Babu et al. |
| 2004/0025493 | A1 | * | 2/2004 | Wojciechowski ........ F02K 3/06 60/224 |

(Continued)

OTHER PUBLICATIONS

Wikipedia, https://en.wikipedia.org/wiki/Bell_Boeing_V-22_Osprey, 2017.*
Wikipedia, https://en.wikipedia.org/wiki/Wright_Flyer, 2017.*

*Primary Examiner* — Gerald L Sung
*Assistant Examiner* — William Breazeal
(74) *Attorney, Agent, or Firm* — Carlson, Gaskey & Olds, P.C.

(57) ABSTRACT

A gas turbine engine comprises a gas generator rotating along a first axis of rotation, with at least one compressor rotor, at least one gas generator turbine rotor and a combustion section. A fan drive turbine rotates along a second axis of rotation, downstream of at least one gas generator turbine rotor. The fan drive turbine drives a pair of shaft portions extending in opposed directions beyond the axis of rotation of the gas generator.

12 Claims, 7 Drawing Sheets

(56) References Cited

U.S. PATENT DOCUMENTS

| | | |
|---|---|---|
| 2008/0098719 A1 | 5/2008 | Addis |
| 2009/0229243 A1 | 9/2009 | Guemmer |
| 2010/0206982 A1* | 8/2010 | Moore .................... B64C 11/48 |
| | | 244/62 |
| 2012/0128487 A1* | 5/2012 | Eames .................. B64C 11/346 |
| | | 416/1 |

* cited by examiner

GAS TURBINE ENGINE WITH PAIRED DISTRIBUTED FAN SETS

CROSS REFERENCE TO RELATED APPLICATION

This application claims priority to U.S. Provisional Patent Application Nos. 61/989,661, filed on May 7, 2014; 61/938,907, filed on Feb. 12, 2014; and 61/937,153, filed on Feb. 7, 2014.

BACKGROUND OF THE INVENTION

Gas turbine engines are known and typically include a fan delivering air as bypass air into a bypass housing and further delivering air into a core engine. Air in the core engine is directed into a compressor where it is compressed. The compressed air is then delivered into a combustion section where it is mixed with fuel and ignited. Products of this combustion pass downstream over turbine rotors, driving them to rotate.

Recently, it has been proposed to increase the diameter of the fan to, in turn, increase bypass ratios, or the volume of air delivered as bypass or propulsion air compared to the volume of air delivered into the core engine. However, the ability to make this increase is somewhat limited by the packaging envelope available on an aircraft.

It has been proposed to replace a single large diameter with a plurality of fan rotors. However, the proposals for driving the plurality of fan rotors have deficiencies in general.

SUMMARY OF THE INVENTION

In a featured embodiment, a gas turbine engine comprises a gas generator rotating along a first axis of rotation, with at least one compressor rotor, at least one gas generator turbine rotor and a combustion section. A fan drive turbine rotates along a second axis of rotation, downstream of at least one gas generator turbine rotor. The fan drive turbine drives a pair of shaft portions extending in opposed directions beyond the axis of rotation of the gas generator.

In another embodiment according to the previous embodiment, each of the shaft portions is configured to drive a respective set of fan rotors.

In another embodiment according to any of the previous embodiments, there are at least three fan rotors in each of the sets of plurality of fan rotors.

In another embodiment according to any of the previous embodiments, a single gas generator is included to drive both shaft portions.

In another embodiment according to any of the previous embodiments, the single gas generator is configured to drive a single fan drive turbine, which is configured to drive both of the fan rotors.

In another embodiment according to any of the previous embodiments, the single gas generator is configured to drive a pair of fan drive turbines, with each of the fan drive turbines being connected to drive the shaft portions.

In another embodiment according to any of the previous embodiments, there are a pair of gas generators.

In another embodiment according to any of the previous embodiments, each of the pair of gas generators is configured to drive a different fan drive turbine, with a connecting shaft connecting the fan drive turbines.

In another embodiment according to any of the previous embodiments, the pair of gas generators is configured to drive a common fan drive turbine to drive the shaft portions.

In another embodiment according to any of the previous embodiments, there are counter-rotating fan rotors in each of the sets of the plurality of fan rotors.

In another embodiment according to any of the previous embodiments, each of the fan rotors is configured to drive a respective shaft portion to drive a first shaft in a first direction. The first shaft is configured to drive a bevel gear to drive a second shaft in each of the sets in a second direction opposed to the first direction.

In another embodiment according to any of the previous embodiments, the gas generator includes at least two compressor rotors and at least two gas generator turbine rotors. The fan drive turbine is positioned to be downstream of a path of the products of combustion having passed over each of at least two gas generator turbine rotors.

In another embodiment according to any of the previous embodiments, a single gas generator is included to drive both shaft portions.

In another embodiment according to any of the previous embodiments, the single gas generator is configured to drive a single fan drive turbine, which is configured to drive both of the fan rotors.

In another embodiment according to any of the previous embodiments, the single gas generator is configured to drive a pair of fan drive turbines, with each of the fan drive turbines being connected to drive the shaft portions, and such that a shaft connects the pair of fan drive turbines.

In another embodiment according to any of the previous embodiments, there are counter-rotating fan rotors in each of the sets of the plurality of fan rotors.

In another embodiment according to any of the previous embodiments, each of the fan rotors is configured to drive a respective shaft portion to drive a first shaft in a first direction, with the first shaft configured to drive a bevel gear to drive a second shaft in each of the sets in a second direction opposed to the first direction.

In another embodiment according to any of the previous embodiments, there are a pair of gas generators.

In another embodiment according to any of the previous embodiments, each of the pair of gas generators is configured to drive a different fan drive turbine, with a connecting shaft connecting the fan drive turbines.

In another embodiment according to any of the previous embodiments, the pair of gas generators is configured to drive a common fan drive turbine to drive the shaft portions.

In another embodiment according to any of the previous embodiments, the gas generator includes at least two compressor rotors and at least two gas generator turbine rotors. The fan drive turbine is positioned to be downstream of a path of the products of combustion having passed over each of at least two gas generator turbine rotors.

In another embodiment according to any of the previous embodiments, the first and second axes are non-parallel.

These and other features may be best understood from the following drawings and specification.

DETAILED DESCRIPTION

Figure 1:
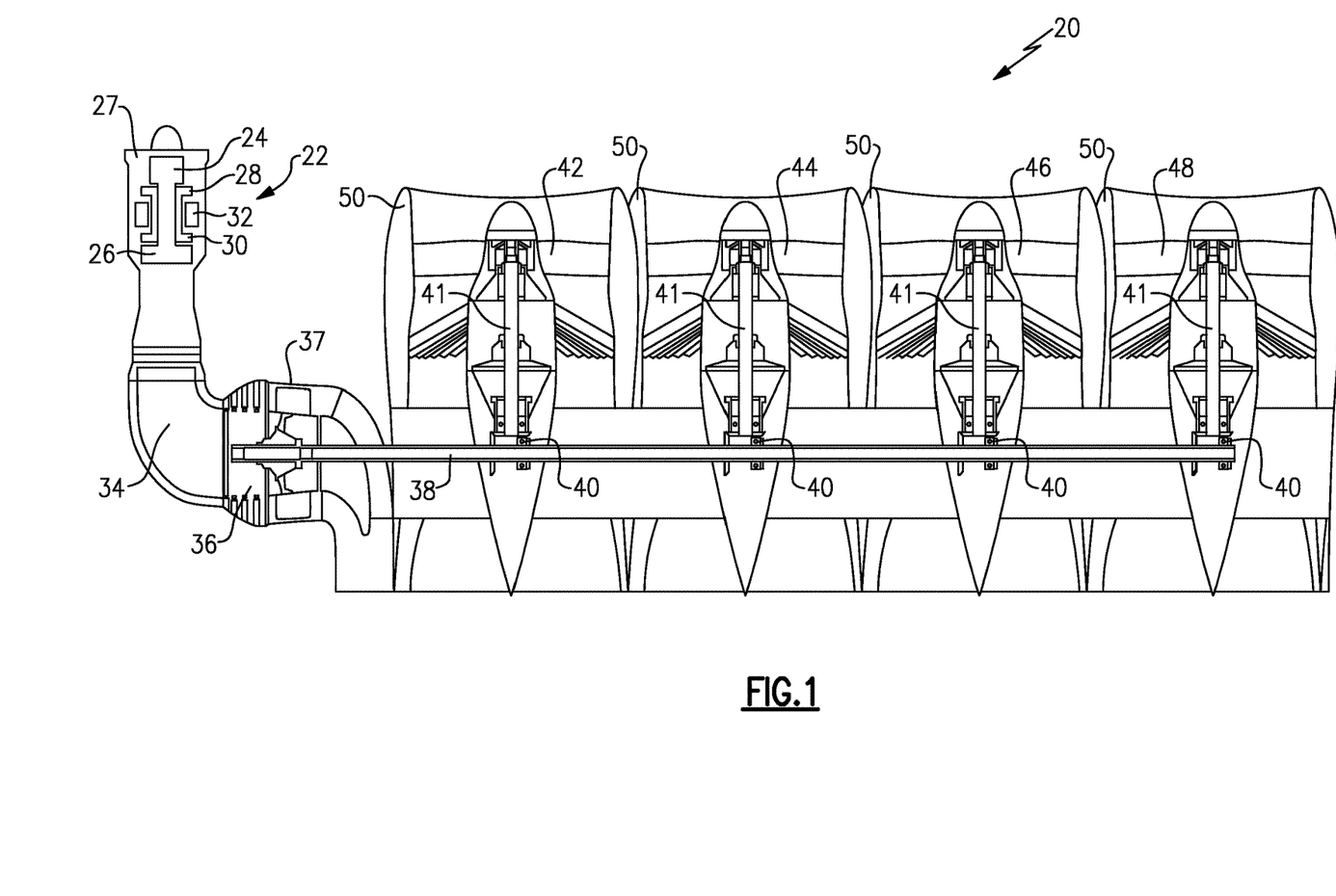
FIG. 1 schematically shows a gas turbine engine.

A gas turbine engine 20 is illustrated in FIG. 1 having a gas generator 22. The gas generator 22 may be a two spool gas generator having a low speed spool in which a first upstream compressor rotor 24 driven by a downstream or low pressure turbine rotor 26. A high speed spool includes a high pressure compressor rotor 28 rotating with a high pressure or upstream turbine rotor 30. A combustion section 32 is positioned intermediate rotors 28 and 30.

An exhaust duct 34 is positioned downstream of the gas generator 22 and receives products of combustion which have driven the turbine rotor 26 to rotate. These products of combustion pass across a fan drive turbine 36 mounted in a housing 37. The fan drive turbine 36 drives a shaft 38 that engages a plurality of bevel gears 40 to, in turn, drive shafts 41 associated with fan rotors 42, 44, 46 and 48. Each of the fan rotors 42, 44, 46 and 48 are mounted within separate housings 50.

By providing a single shaft 38, which drives at least four fan rotors and by utilizing a fan drive turbine 36 which is positioned downstream of the last turbine rotor 26 in a gas generator 22, this disclosure provides compact packaging, while still providing adequate drive for the fan rotors 42, 44, 46 and 48.

Figure 2:
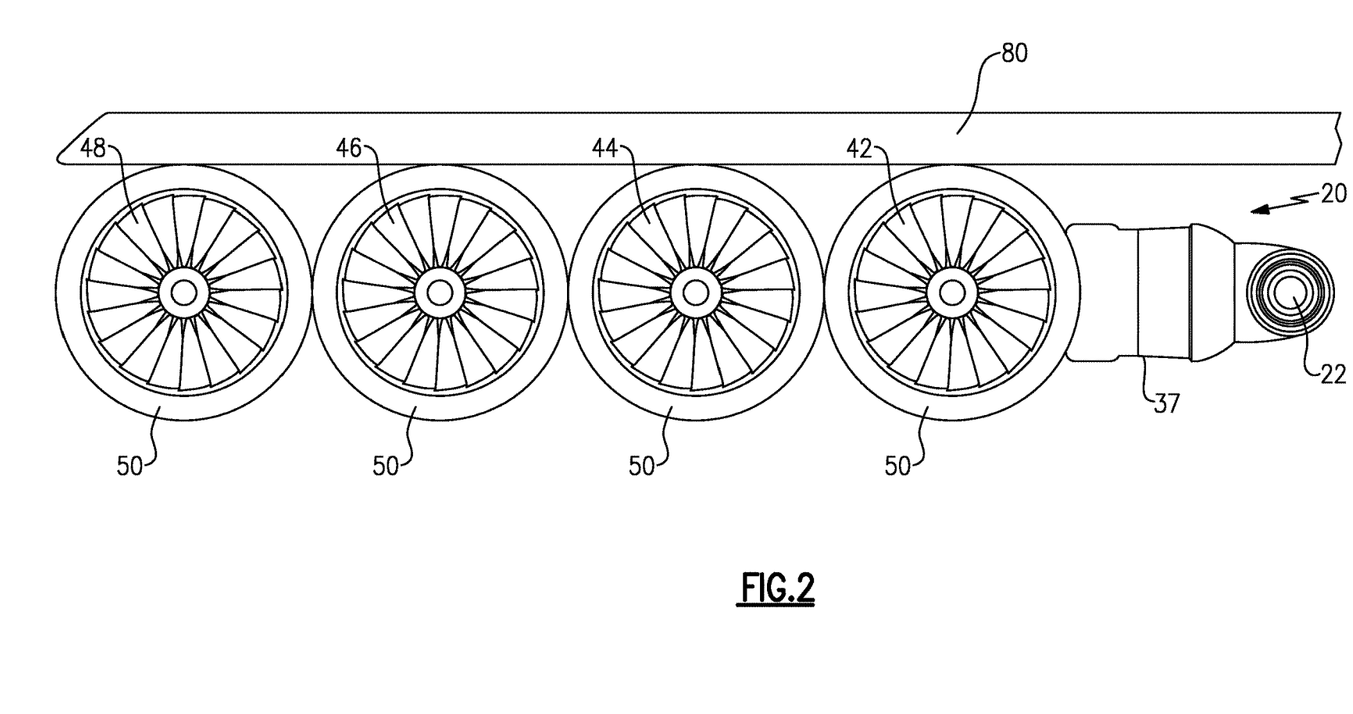
FIG. 2 is a front view of the FIG. 1 engine.

FIG. 2 is a front view of an aircraft wing 80, which may mount an engine such as engine 20. As shown, the gas generator is associated with the housing 37. The fan rotors 42, 44, 46 and 48 have diameters that are not unduly large, such that they fit within the packaging window of associated wing 80.

The basic engine as described above is disclosed in co-pending U.S. patent application Ser. No. 14/597,510, entitled "Gas Turbine Engine With Distributed Fans" and filed on even date herewith. This basic fan structure can be incorporated into a gas turbine engine arrangement having one or more gas generators, and paired sets of the distributed fan.

Figure 3:
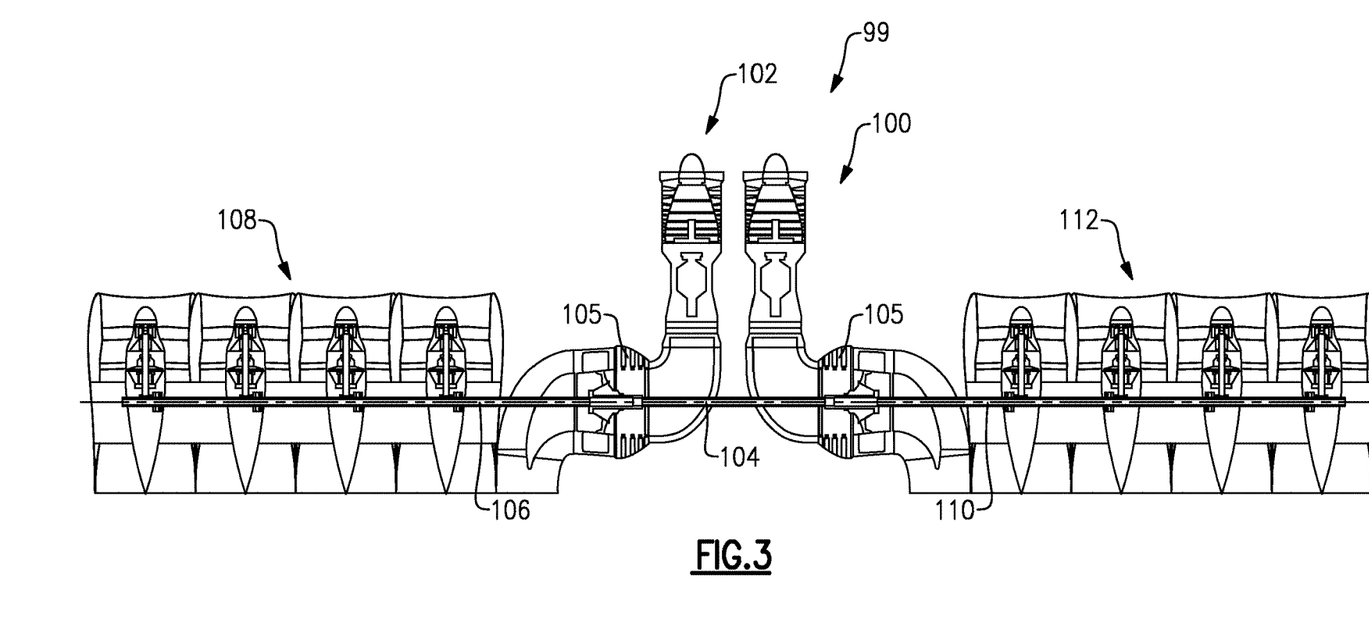
FIG. 3 shows a first embodiment.

Thus, as shown in FIG. 3, an engine 99 includes paired gas generators 100 and 102 driving a common shaft 104 through paired fan drive turbines 105. The single shaft 104 connects the turbines 105, and a first branch 106 extends to a plurality of fans 108, and a second branch 110 extends to a second plurality of fans 112. In the disclosed embodiment, there are at least three and more narrowly at least four fans in each of the fan sets 108 and 112. This arrangement allows the incorporation of a centrally positioned gas generator 100/102, centrally driving a large number of fans 108 and 112.

Figure 4:
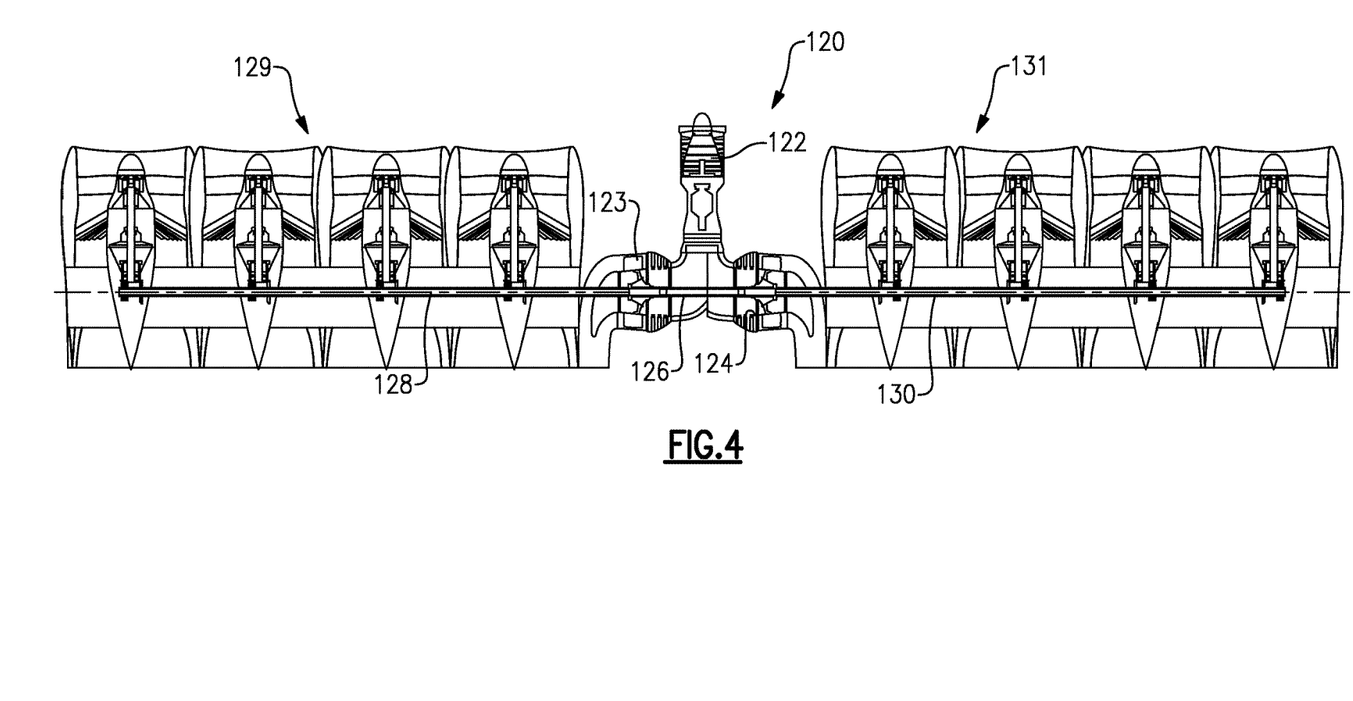
FIG. 4 shows a second embodiment.

FIG. 4 shows another embodiment 120 wherein a single gas generator 122 drives a pair of fan drive turbines 123 and 124. Again, a shaft section 126 connects the fan drive turbines 123 and 124. A first shaft section 128 extends in a first direction away from the gas generator 122 to drive a plurality of fans 129 while a second shaft section 130 extends in an opposed direction beyond the gas generator 122 to drive a plurality of fans 131.

Figure 5:
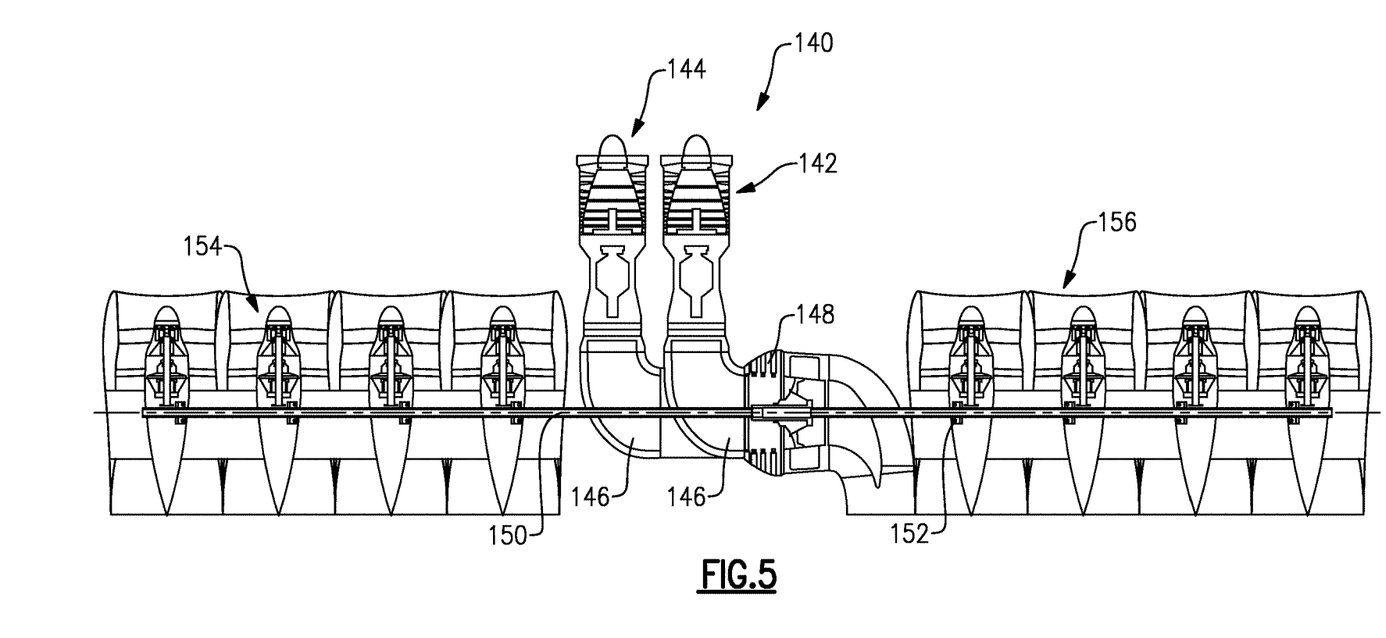
FIG. 5 shows a third embodiment.

FIG. 5 shows yet another arrangement 140 wherein there are a pair of gas generators 142 and 144 communicating with an exhaust duct 146 which distributes the products of combustion of each of the two gas generators 142 and 144 across a fan drive turbine 148. A first shaft section 150 drives a first plurality of fans 154, and a second shaft section 152 drives a second plurality of fan rotors 156.

Figure 6:
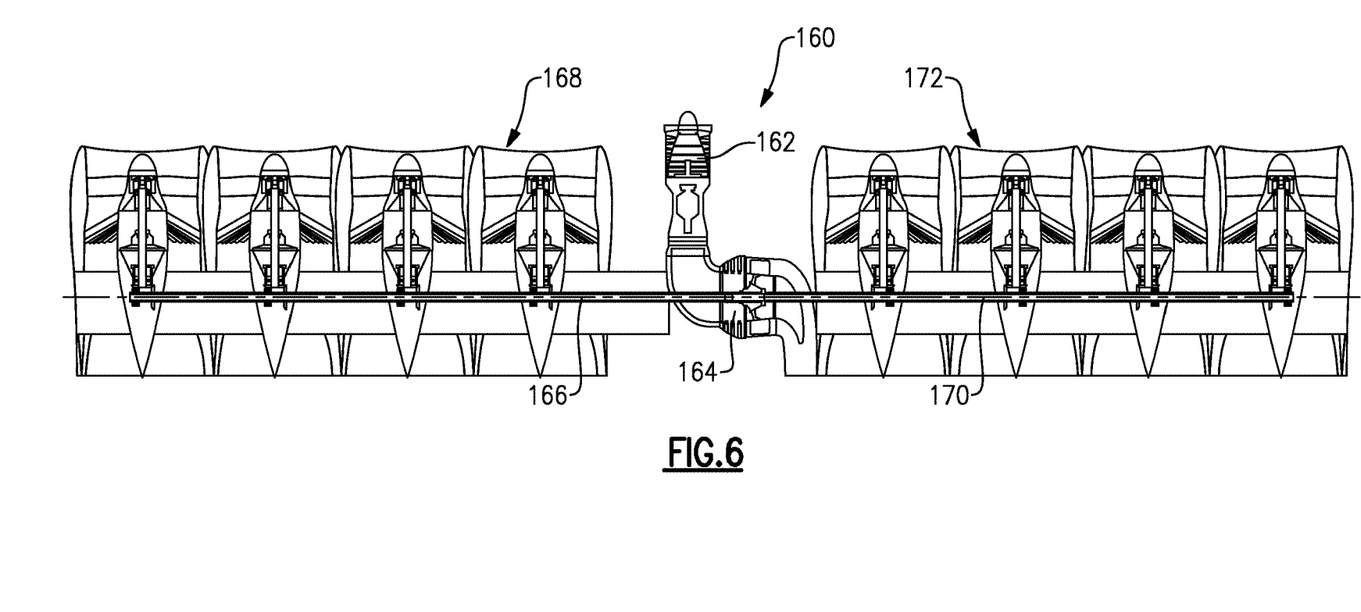
FIG. 6 shows a fourth embodiment.

FIG. 6 shows yet another embodiment 160 wherein a single gas generator 162 drives a single fan drive turbine 164. The fan drive turbine 164 drives a shaft portion 166 to in turn drive a plurality of fan rotors 168 and also a shaft section 170 to drive a second plurality of fan rotors 172.

Figure 7:
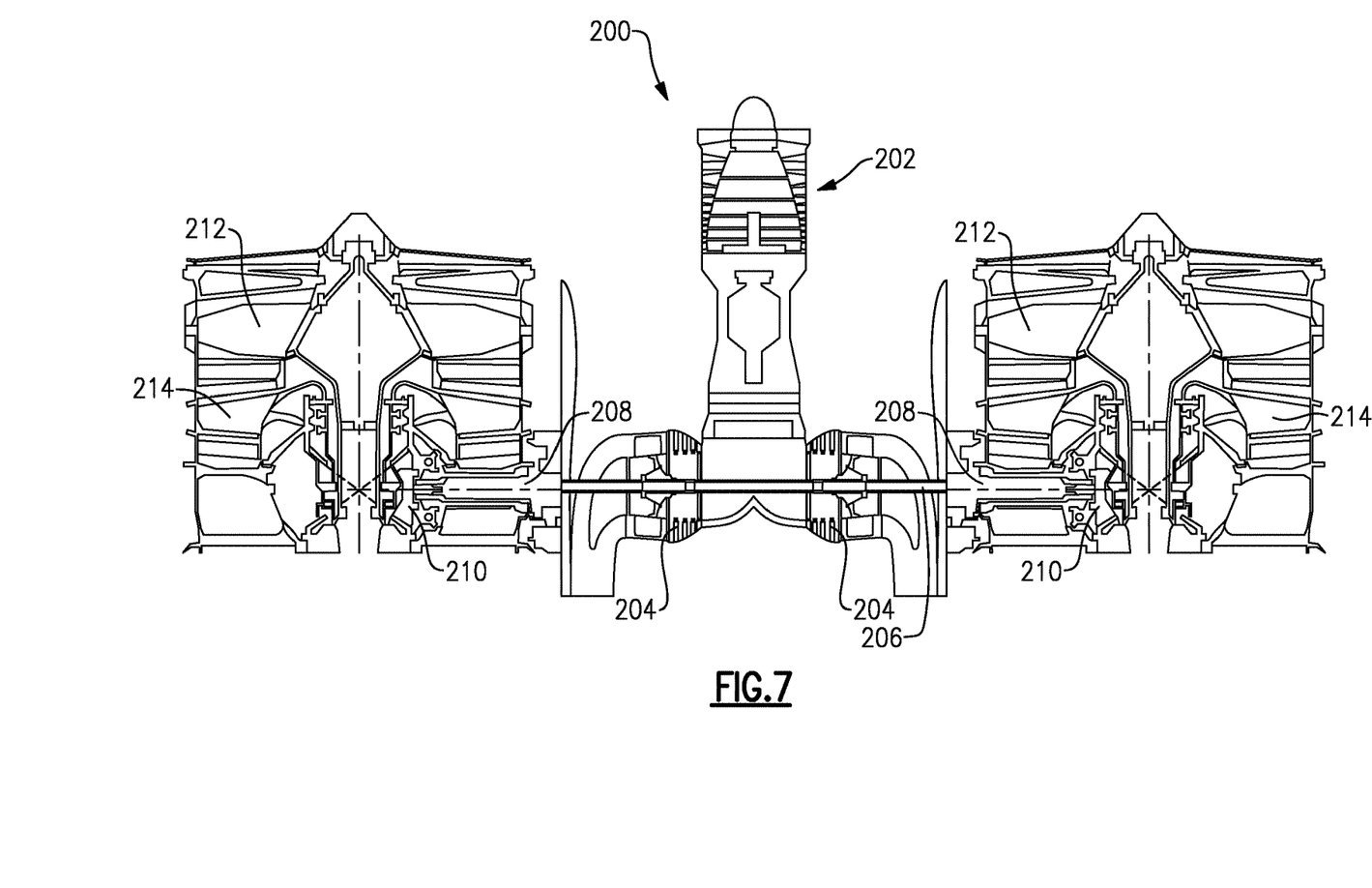
FIG. 7 shows a fifth embodiment.

FIG. 7 shows another embodiment 200 wherein a single gas generator 202 drives a pair of fan drive turbines 204. The fan drive turbines 204 drive shaft portions 208 extending in opposed directions to drive a bevel gear 210. The shaft portion 208 drives a first rotor 212 while the bevel gear 210 drives a second rotor 214. The rotors 212 and 214 rotate in different directions with one rotating counter-clockwise and the other rotating clockwise.

Each of the disclosures has at least one central gas generator driving shaft portions extending in opposed directions away from an axis of rotation of the gas generator. In this way, the power to pairs of plural fans is provided at a central location As is clear in each embodiment of FIGS. 3-7, the gas generators define an axis or axes of rotation. A pair of shaft portions extends in opposed directions, and beyond the axis of rotation.

Gas turbine engines consistent with these embodiments include a gas generator with at least one compressor rotor, at least one gas generator turbine rotor and a combustion section. At least one fan drive turbine is positioned downstream of a path of the products of combustion having passed over the at least one gas generator turbine rotor. The fan drive turbine(s) drives a pair of shaft portions extending in opposed directions, beyond or away from an axis of rotation of the gas generator, and in opposed directions with each of the shaft portions driving a set of a plurality of fan rotors. As shown, each gas generator rotates on a first axis of rotation that is non-parallel to the axes of the shaft portions. Further, the first axis is non-parallel to a second axis about which the fan drive turbine rotates. However, the first and second axes could be parallel.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
at least one gas generator rotating along a first axis of rotation, with a compressor section, a gas generator turbine rotor section and a combustion section;
a first free turbine on a first side of the gas generator rotating along a second axis of rotation, wherein the second axis of rotation is angled relative to the first axis of rotation;
a second free turbine on a second side of the gas generator opposite the first side of the gas generator, wherein the first free turbine and the second free turbine are downstream of said gas generator turbine rotor section and wherein each of the first free turbine and the second free turbine are driven by exhaust from said at least one gas generator;
a shaft joined to the first free turbine and to the second free turbine and driven to rotate along the second axis of rotation by the first free turbine and the second free turbine; and
at least one first fan rotor on said first side driven by the shaft, and at least one second fan rotor on said second side driven by the shaft.

2. The gas turbine engine as set forth in claim 1, wherein said at least one gas generator is a single gas generator.

3. The gas turbine engine as set forth in claim 1, wherein said at least one gas generator comprises a first gas generator and a second gas generator.

4. The gas turbine engine as set forth in claim 3, wherein exhaust from the first gas generator only directly drives the first free turbine and wherein exhaust from the second gas generator only directly drives the second free turbine.

5. The gas turbine engine as set forth in claim 1, wherein the at least one first fan rotor and the at least one second fan rotor are each counter-rotating fan rotors.

6. The gas turbine engine as set forth in claim 5, wherein each of said at least one first fan rotor and said second fan rotor comprises a respective first fan shaft and a respective second fan shaft, wherein a respective bevel gear drives each respective first fan shaft in a first direction and drives each respective second fan shaft in a second direction opposite to the first direction.

7. The gas turbine engine as set forth in claim 1, wherein said at least one gas generator includes at least two compressor rotors and at least two gas generator turbine rotors, with the first free turbine and the second free turbine each being positioned downstream in an exhaust direction of said at least two gas generator turbine rotors.

8. The gas turbine engine as set forth in claim 1, wherein the at least one first fan rotor and the at least one second fan rotor each comprise at least three respective fan rotors.

9. A gas turbine engine comprising:
two gas generators, each gas generator of the two gas generators comprising a compressor section, a gas generator turbine rotor section and a combustion section, a first axis parallel to a respective axis of rotation of each of the two gas generators;
a free turbine on a first side of the two gas generator rotating along a second axis of rotation, wherein the second axis of rotation is angled relative to the first axis of rotation;
wherein the free turbine is driven by exhaust from each of said two gas generator;
a shaft joined to the free turbine and driven to rotate along the second axis of rotation by the free turbine; and
at least one first fan rotor on said first side driven by the shaft, and at least one second fan rotor on a second side opposite the first side driven by the shaft.

10. The gas turbine engine as set forth in claim 1, wherein the at least one first fan rotor and the at least one second fan rotor are counter-rotating fan rotors.

11. The gas turbine engine as set forth in claim 5, wherein each of said at least one first fan rotor and said second fan rotor comprises a respective first fan shaft and a respective second fan shaft, wherein a respective bevel gear drives each respective first fan shaft in a first direction and drives each respective second fan shaft in a second direction opposite to the first direction.

12. The gas turbine engine as set forth in claim 1, wherein said at least one gas generator includes at least two compressor rotors and at least two gas generator turbine rotors, with the first free turbine and the second free turbine being positioned downstream in an exhaust direction of said at least two gas generator turbine rotors.

* * * * *